Patented Apr. 19, 1932

1,854,649

UNITED STATES PATENT OFFICE

RAYMOND J. FRANK, OF ELMA, IOWA

LOADING MACHINE

Application filed July 18, 1930. Serial No. 468,922.

This invention relates generally to loading machines and more particularly to an apparatus of this character which is adapted for use in loading manure but it is to be understood that a machine in accordance with this invention may be utilized for any purpose for which the same is found adapted and desirable.

An important object of the invention is to provide, in a manner as hereinafter set forth, a loading machine of the aforementioned character which is adapted to be mounted for operation on a conventional tractor and which further includes means for connection with the power take-off of the tractor for actuation by said power take-off.

Another important feature of the invention resides in the provision of novel means operatively connected to the power takeoff of the tractor whereby said tractor with the loading machine mounted thereon may be moved or fed into a pile of material being loaded.

Other objects of the invention are to provide a loading machine which will be comparatively simple in construction, strong, durable, highly efficient in its use and which may be manufactured at a low cost.

Figure 1:
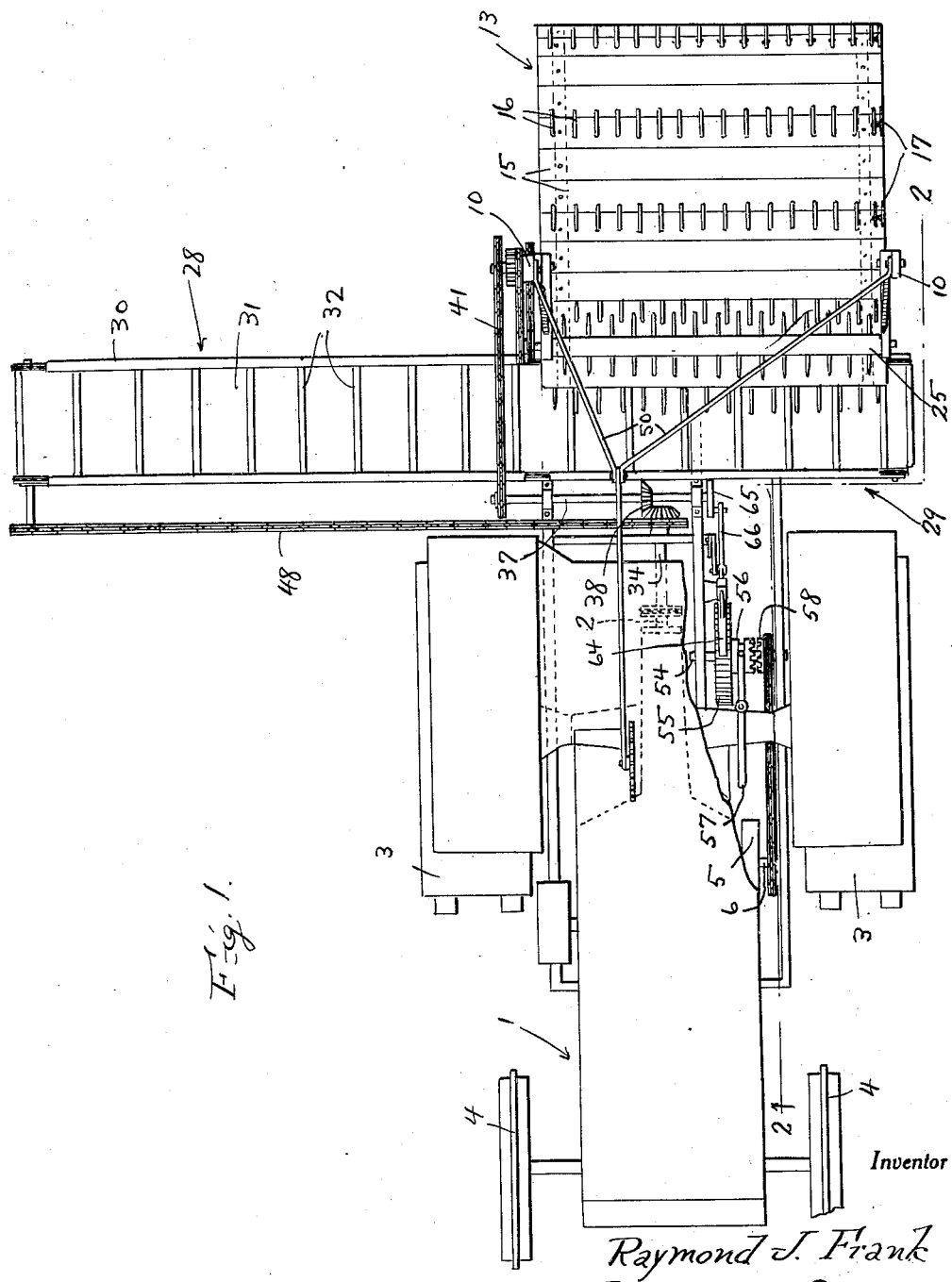
Figure 2:
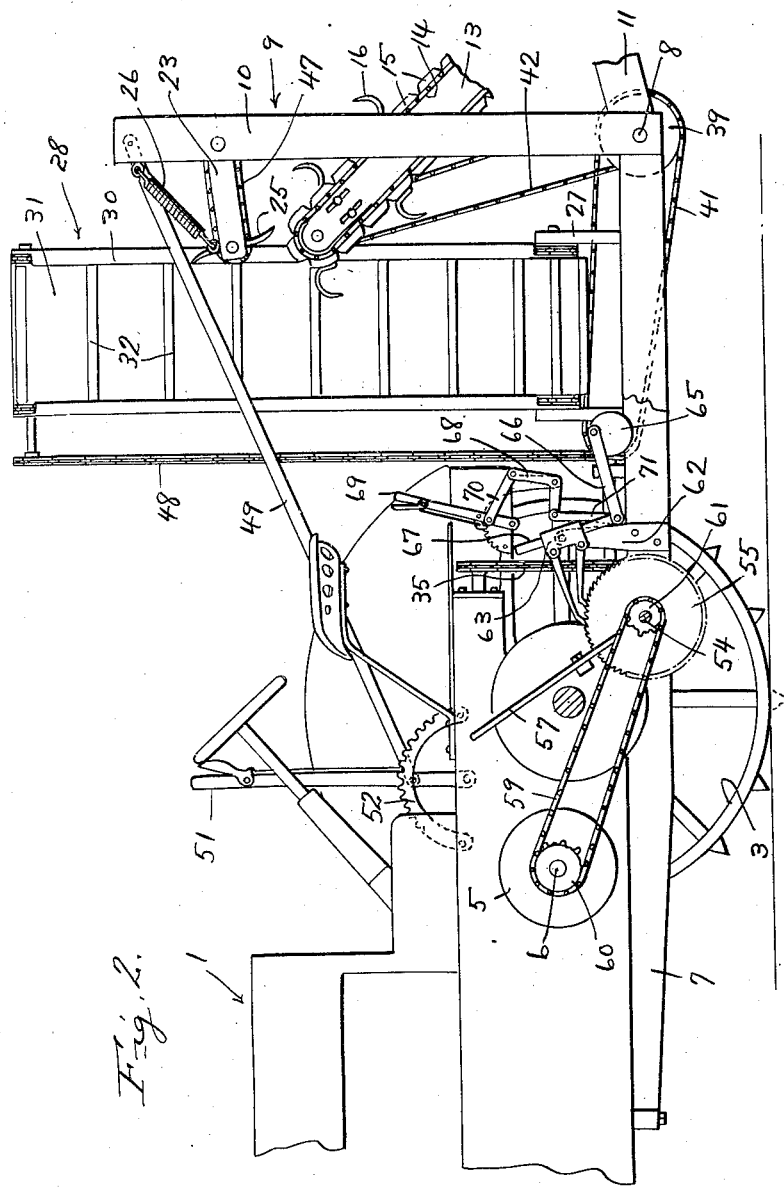

All of the foregoing and still further objects and advantages of the invention will become apparent from a study of the following specification, taken in connection with the accompanying drawings wherein like characters of reference designate corresponding parts throughout the several views, and wherein:

Figure 1 is a view in top plan of a loading machine constructed in accordance with this invention mounted in operative position on the rear end portion of a tractor, Figure 2 is a longitudinal sectional view taken substantially on the line 2—2 of Figure 1.

Referring to the drawings in detail it will be seen that the reference numeral 1 designates generally a tractor of the type having a rearwardly disposed power take off shaft 2 connected to the engine of the tractor (not shown). The tractor 1 further includes the usual rear wheels 3, front wheels 4 on the brake drum 5 and shaft 6.

A horizontally disposed frame 7 is secured in any suitable manner beneath the tractor 1 and projects rearwardly therefrom and mounted transversely for rotation in the rear end portion of the frame 7 is a shaft 8 upon which is mounted a swingable frame designated generally by the reference numeral 9 and comprising the rigidly connected uprights 10 and the rearwardly extending substantially horizontally disposed arms 11.

An upwardly and forwardly disposed endless conveyor 13 is rigidly mounted in the frame 9 for swinging movement therewith and said conveyor includes a pair of side chains 14 at the opposite ends of the slats 15. In spaced relation across the front of the slats 15 are the material engaging hooks 16 and also mounted on certain of the slats 15 adjacent one end only thereof are the knives 17.

The chains 14 are trained over suitable sprocket wheels provided therefor at the ends of the conveyor 13.

Mounted for swinging movement on the uprights 10 and extending therefrom over the upper end of the conveyor 13 is a pair of arms 23.

A rotary kicker 25 is journalled for rotation between the free end portions of the arms 23 for removing the material from the upper end of the conveyor 13. The kicker 25 is maintained in spaced relation above the upper end of the conveyor 13 by the coil springs 26 having one end anchored to the upper end portion of the upright 10 and their other ends anchored to the free end portions of the arms 23. The conveyor 13 constitutes a material gathering means.

Referring to Figure 2 of the drawings, it will be seen that vertical supporting posts 27 are mounted on the stationary frame 7 intermediate the tractor 1 and the swingable frame 9.

The posts 27 support a loading conveyor designated generally by the reference numeral 28 and comprising a horizontally disposed portion 29 extending beneath the upper end of the gathering conveyor 13 in a manner to receive the material therefrom and an outwardly extending inclined portion 30. The conveyor 28 includes an apron 31 having mounted thereon the transverse slats 32 which are spaced with respect to each other. The horizontal portion 29 of the conveyor 28 is stationary and the inclined section 30 is pivotally mounted for swinging movement thereon.

A shaft 34 is mounted in suitable bearings provided therefor and operatively connected to the power take off shaft 2 of the tractor 1 through the medium of the chain 35 (see Figure 2) which is trained over a sprocket provided therefor on the shaft 34 and over a sprocket fixed on the power take off shaft.

A transversely disposed horizontal shaft 37 is mounted in bearings provided therefor in the frame 7 and connected to the shaft 34 for actuation thereby through the medium of the beveled gears 38.

Referring now to Figure 2 of the drawings, it will be seen that a sprocket wheel 39 is fixed on the shaft 8 and is operatively connected to a sprocket wheel on one end portion of the shaft 37 by the chain 41. The conveyor 13 is operatively connected to the shaft 8 for actuation thereby through the medium of the sprocket chain 42.

The chain 42, of course, is trained over suitable sprocket wheels provided therefor on the shaft 8 and on the upper shaft of the conveyor 13.

Suitable means including a chain 47, is provided for connecting the kicker 25 to the upper shaft of the conveyor 13 for actuation thereby. The loading conveyor 28 is driven through the medium of the sprocket chain 48 which is operatively connected to the shaft 34 and to the upper end portion of said loading conveyor.

A bar 49 has secured to one end the diverging arms 50 which are pivotally connected to the upper end portions of the uprights 10. The bar 49 extends downwardly and forwardly and is pivotally connected to the hand lever 51 having means thereon engageable with the toothed segment 52 for releasably retaining the lever against swinging movement. Upon actuation of the lever 51 the frame 9 may be swung in a manner to raise and lower the conveyor 13.

Referring now to Figures 1 and 2 of the drawings, it will be seen that a horizontally disposed shaft 54 is mounted transversely for rotation in the stationary frame 7 at a point forwardly of the conveyor 28. A ratchet wheel 55 is fixed on the shaft 54 and slidably keyed on the shaft 54 is a clutch member 56 operable through the medium of the hand lever 57 to be engaged or disengaged with the clutch member 58 which is loosely mounted on the shaft 54. The clutch member 58 has formed integrally thereon a sprocket gear over which is trained the chain 59 which passes over the sprocket gear 60 (see Figure 2) which is mounted on the shaft 6 which supports the brake 5.

The sprocket gear which is formed integrally on the clutch member 58 is designated by the reference numeral 61. A bracket 62 extends upwardly from the stationary frame 7 of the machine and mounted for oscillating movement on the upper end of said bracket is a sleeve 63 to the upper and lower ends of which are pivotally connected the pawls 64 having their free ends operatively engaged with the ratchet wheel 55. A disk 65 is fixed on the adjacent end of the shaft 37 and pivotally connected eccentrically thereto is the pitman 66 having pivotally connected to its free end the rod 67 which is disposed slidably through the sleeve 63. A bell crank 68 is mounted for swinging movement on the tractor and has one end connected to the hand lever 69 by the link 70.

The opposite end of the bell crank 68 is connected to the rod 67 and the pitman 66 in a manner to adjustably support the same by the link 71.

In operation, when the engine of the tractor is running, the various conveyors are driven from the power take off shaft 2 of said tractor in the manner hereinbefore explained.

The tractor, with the loading machine mounted thereon, is caused to move into the pile of material as said material is loaded by engaging the clutch members 56 and 58. This is accomplished by reason of the fact that the sleeve 63 is oscillated through the medium of the rod 67, the pitman 66 and the disk 65 fixed on the rotating shaft 37, which, as hereinbefore stated, is driven from the power take off shaft 2.

When the sleeve 63 is oscillated, pawls 64 will impart intermittent rotary movement to the ratchet wheel 55 in an obvious manner, thereby rotating the shaft 54. The shaft 6 upon which the brake 5 is mounted is actuated by the chain 59, it being understood, of course, that the said shaft 6 is operatively connected to the wheels 3 of the tractor through the usual axle, differential, etc.

The speed at which the tractor will be moved toward the pile of material is regulated by actuating the bell crank 68 through the medium of the hand lever 69 in a manner to shift the rod 67 in the sleeve 63. The loader is preferably driven through one side of the pile of material and moved progressively over after passing through the pile. The knives 17 are disposed on the conveyor 13 which is adjacent the material through which the machine is passing. The conveyor 13 moves the material upwardly and deposits the same on the horizontal portion 29 of the loading conveyor 28 and said material then passes upwardly over the inclined portion 30 of said loading conveyor and is deposited into the vehicle body disposed thereneath (not shown).

It is believed that the many advantages of a loading machine constructed in accordance with this invention will be readily understood, and although the preferred embodiment of the invention is as illustrated and described, it is to be understood that changes in the details of construction may be had which will fall within the scope of the invention as claimed.

What is claimed is:

1. In combination with a tractor having a power take-off, a rotatably mounted ratchet wheel, a rockable member, pawls pivotally connected to the end portions of said member and operatively engaged with the ratchet wheel for actuating the same in a step by step fashion, means operatively connecting the ratchet wheel to the drive wheels of the tractor, and means adjustably connecting the member to the power take-off for actuation thereby.

2. In combination with a tractor having a power take-off, a rotatably mounted ratchet wheel, a rockable member, pawls pivotally connected to the end portions of said member and operatively engaged with the ratchet wheel for actuating the same in a step by step fashion, means operatively connecting the ratchet wheel to the drive wheels of the tractor, and means adjustably connecting the member to the power take-off for actuation thereby, the first named means including a manually operable clutch for selectively connecting or disconnecting the ratchet wheel and the drive wheels.

3. In combination with a tractor having a power take-off, a rotatably mounted ratchet wheel, a rockably mounted sleeve, pawls pivotally connected to the end portions of the sleeve and operatively engaged with the ratchet wheel for actuating the same in a step by step fashion, clutch controlled means for operatively connecting the ratchet wheel to the drive wheels of the tractor for propelling said tractor, a shaft operatively connected to the power take-off for actuation thereby, a disc fixed on the shaft, a pitman pivoted eccentrically on the disc, a rod pivotally connected to the pitman and extending slidably through the sleeve, and a lever operatively connected to the rod for slidably adjusting the same in the sleeve.

In testimony whereof I affix my signature.

RAYMOND J. FRANK.